United States Patent [19]

Tonogaki et al.

[11] Patent Number: 5,599,859
[45] Date of Patent: Feb. 4, 1997

[54] INK, INK-JET RECORDING PROCESS AND APPARATUS MAKING USE OF THE SAME

[75] Inventors: Masahiko Tonogaki; Yuko Suga, both of Tokyo; Akio Kashiwazaki; Aya Takaide, both of Yokohama, all of Japan

[73] Assignee: Canon Kabushiki Kaisha, Tokyo, Japan

[21] Appl. No.: 519,358

[22] Filed: Aug. 25, 1995

Related U.S. Application Data

[62] Division of Ser. No. 212,792, Mar. 15, 1994, Pat. No. 5,492,952.

[30] Foreign Application Priority Data

Mar. 22, 1993 [JP] Japan ........ 5-62111
Apr. 9, 1993 [JP] Japan ........ 5-83511

[51] Int. Cl.⁶ ............................................. C09D 11/02
[52] U.S. Cl. ................... 524/95; 524/549; 106/20 D; 347/100
[58] Field of Search ............................. 524/190, 192, 524/95, 549; 106/20 D; 347/100

[56] References Cited

U.S. PATENT DOCUMENTS

| | | | |
|---|---|---|---|
| 4,279,653 | 7/1981 | Makishima et al. | 106/22 |
| 4,804,411 | 2/1989 | Eida et al. | 106/22 |
| 4,864,324 | 9/1989 | Shirota et al. | 346/1.1 |
| 5,017,644 | 5/1991 | Fuller et al. | 106/20 D |
| 5,147,926 | 9/1992 | Meichsner et al. | 524/591 |
| 5,160,370 | 11/1992 | Suga et al. | 106/20 |
| 5,172,133 | 12/1992 | Suga et al. | 346/1.1 |
| 5,184,148 | 2/1993 | Suga et al. | 346/1.1 |
| 5,229,786 | 7/1993 | Suga et al. | 346/1.1 |
| 5,451,251 | 9/1995 | Mafune et al. | 106/22 H |

FOREIGN PATENT DOCUMENTS

| | | |
|---|---|---|
| 0130336 | 1/1985 | European Pat. Off. . |
| 0367051 | 5/1990 | European Pat. Off. . |
| 3319239 | 11/1984 | Germany . |
| 56-147860 | 11/1981 | Japan . |
| 56-147859 | 11/1981 | Japan . |
| 58-80368 | 5/1983 | Japan . |
| 60-50054 | 11/1985 | Japan . |
| 61-200182 | 9/1986 | Japan . |
| 61-247774 | 11/1986 | Japan . |
| 61-272278 | 12/1986 | Japan . |
| 62-568 | 1/1987 | Japan . |
| 62-101671 | 5/1987 | Japan . |
| 62-101672 | 5/1987 | Japan . |
| 63-159485 | 7/1988 | Japan . |
| 1-249869 | 10/1989 | Japan . |
| 1-301760 | 12/1989 | Japan . |
| 4-57859 | 2/1992 | Japan . |
| 4-57860 | 2/1992 | Japan . |

*Primary Examiner*—Jeffrey T. Smith
*Attorney, Agent, or Firm*—Fitzpatrick, Cella, Harper & Scinto

[57] ABSTRACT

Provided is an ink composition suitable for an ink jet system, which comprises a pigment or a dye, an aqueous medium, a water soluble resin having an oxazolyl group or a fine particle having an oxazolyl group adsorbed on its outer surface and a compound having at least one carbonyl group wherein the composition has a viscosity of not more than 15 cp at 25° C.

21 Claims, 3 Drawing Sheets

INK, INK-JET RECORDING PROCESS AND APPARATUS MAKING USE OF THE SAME

This application is a division of application Ser. No. 08/212,792 filed Mar. 15, 1994 now U.S. Pat. No. 5,492,952.

BACKGROUND OF THE INVENTION

1. Field of the Invention

The present invention relates to an ink suited for ink-jet printers, and also to an ink-jet recording process and apparatus that make a record on paper by causing ink to fly from orifices of a recording head by the action of energy, preferably heat energy. More particularly, it relates to an ink-jet recording process and apparatus that make a record on non-coated paper such as paper for copying, paper for reporting, notepaper, letter paper, bond paper and computer printout paper (continuous business forms) commonly used in offices and homes.

2. Related Background Art

Ink-jet recording systems have the advantages that they make less noise in the course of recording and a recorded image with a high resolution can be obtained at a high speed because of use of a highly integrated head. Inks used in such ink-jet recording systems are those prepared by dissolving various kinds of water-soluble dyes in water or in a mixed solution of water and an organic solvent.

When the water-soluble dyes are used, however, light fastness of recorded images is often questioned because such water-soluble dyes have poor light fastness by nature.

Water fastness of recorded images is also often questioned because the dye is water-soluble. More specifically, if recorded images become wet with rain, sweat, or water from food and drink, they may become blurred or disappear.

Meanwhile, light fastness and water fastness are similarly questioned also in writing utensils such as ball-point pens because water-soluble dyes are mainly used, and various water-based pigment inks for writing utensils have been proposed so that such problems can be settled. Examples of studies on dispersion stability, prevention of ink solidification at pen points and prevention of ball wear of ball-point pens for the purpose of putting water-based pigment inks into practical use are seen in Japanese Patent Application Laid-Open No. 58-80368, No. 61-200182, No. 61-247774, No. 61-272278, No. 62-568, No. 62-101671, No. 62-101672, No. 1-249869, No. 1-301760, etc. Recently, ball-point pens or markers making use of water-based pigment inks have become commercially available.

Also ink-jet recording inks making use of water-based pigment inks, pigment inks making use of specific water-soluble solvent and polymeric dispersant are proposed in Japanese Patent Application Laid-Open No. 56-147859 and No. 56-147860. Inks making use of a pigment and a dye in combination are also proposed in Japanese Patent Application Laid-Open No. 4-57859 and No. 4-57860.

In ink-jet recording, it is very important for non-volatile components in the ink to rapidly cohere after ejection onto the recording paper. When, however, the conventional water-based pigment inks are used in ink-jet recording, the non-volatile components which have cohered on recording paper are kept present on the recording paper as a solid material after the ink has been fixed thereon. Hence, there has been the problem that print surfaces stain when strongly rubbed or when traced with a highlighter pen (fluorescent-ink pen).

When conventional inks are used to make a record by ink-jet recording on plain paper on which no particular ink-receiving layer is formed, there also has been the problem that feathering may occur, though it differs more or less depending on composition. Accordingly, in order to prevent the feathering, it is proposed to add a highly viscous solvent to ink. The feathering can be prevented by increasing the ink viscosity. However, a highly viscous organic solvent must be added in a large quantity for such purpose, so that the ink comes to have an excessively high viscosity which brings about the problem that the ejection of ink may become unstable because of a decrease in ejection speed of the ink from nozzles or a decrease in surface tension. There still also has been the problem that the degree of print density or feathering may differ depending on the types of recording paper.

As an attempt to solve such problems, Japanese Patent Publication No. 60-500540 and Japanese Patent Application Laid-open No. 63-159485 disclose techniques in which iodine or the like is added to ink to improve the quality level of prints on a specific recording paper. The techniques disclosed in these publications, however, are not effective for a great variety of recording paper.

SUMMARY OF THE INVENTION

Accordingly, an object of the present invention is to provide an ink that can be free from any irregular print quality level due to differences in the types of recording paper and can satisfy fixing speed and rub-off fastness, and also thereby obtain stable recorded images without decreasing print density.

Another object of the present invention is to provide an ink that enables blurring-free recording on all sorts of recording paper without excessively increasing the viscosity of the ink and also has superior recording performances in variety, and an ink-jet recording process and apparatus making use of the ink; more specifically, to provide an ink that has solved the problems of blurring of ink and slow-drying of recorded matter that may occur when recording is performed on non-coated paper, what is called plain paper, such as paper for copying, paper for reporting, notepaper, letter paper, bond paper and computer printout paper commonly used in offices and so forth.

A still another object of the present invention is to provide an ink that is very safe when used in offices and homes.

The above objects of the present invention can be achieved by the invention as described below.

The present invention is an ink comprising a hydrazide compound selected from the group consisting of a compound represented by the following Formula (I) or (II), a styrene-maleic acid resin having at least two hydrazide groups and a polyacrylic acid having at least two hydrazide groups, and a compound having at least one carbonyl group.

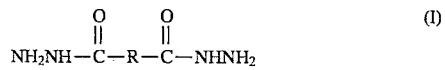

wherein R represents $(CH_2)_n$ or $C_6H_4$, where n is an integer of 0 to 10.

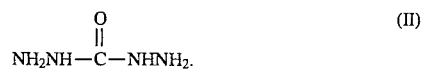

The present invention also provides an ink comprising a water-soluble resin having an oxazolyl group or a fine particle having oxazolyl groups adsorbed on its outer surface, and a compound having at least one carbonyl group.

The present invention also provides an ink-jet recording process comprising ejecting an ink from an orifice according to recording signals to make a record on a recording medium, wherein said ink is the ink described above.

The present invention still also provides a recording unit comprising an ink holder that holds an ink, and a head assembly for ejecting the ink in the form of ink droplets, wherein said ink is the ink described above.

The present invention further provides an ink-jet recording apparatus comprising a recording head for ejecting ink droplets, an ink cartridge having an ink holder that holds an ink, and an ink feeding means for feeding the ink to the recording head, wherein said ink is the ink described above.

DESCRIPTION OF THE PREFERRED EMBODIMENTS

Figure 1A:
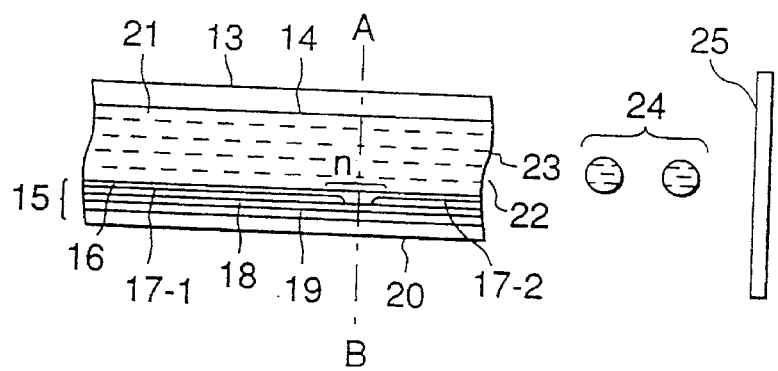
FIG. 1A is a transverse cross section of an example of a liquid flow path of a recording head suited for the present invention.

First Preferred Embodiment: (Embodiment in which a hydrazide compound is used)

The present inventors have discovered that, in a water-based pigment ink, use of a compound with a specific structural formula brings about an improvement in rub-off fastness of prints and can solve the problems previously discussed, while maintaining print quality level, and thus have accomplished the present invention. More specifically, a compound represented by the formula

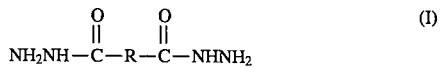

(I)

wherein R represents $(CH_2)_n$ or $C_6H_4$, where n is an integer of 0 to 10, or the formula

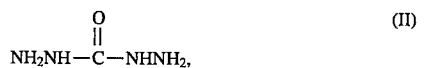

(II)

a styrene-maleic acid resin having two or more hydrazide groups and a polyacrylic acid having two or more hydrazide groups (these compounds are hereinafter generically called a hydrazide compound) have the properties of uniformly dissolving in an aqueous solution and, once water has disappeared, reacting with a compound having a carbonyl group. With utilization of such properties, this hydrazide compound is added in a water-based ink so that it is cross-linked with carbonyl groups of a dispersant or the like contained in the ink on recording paper, to form a film of non-volatile components, whereby an improvement in rub-off fastness of prints can be achieved. Moreover, the cross-linking reaction uniformly takes place without regard to the types of paper, and hence any dependence of print quality on recording paper can be eliminated.

The present inventors also made extensive studies on a variety of ink compositions so that blurring-free properties, drying performance and penetrability of ink on plain paper can be improved. As a result, they have discovered that the above hydrazide compounds bring about good results against blurring, also have no ill effect on the prevention of clogging and also have no safety problem on, promising high reliability. They have thus accomplished the present invention.

More specifically, according to research made by the present inventors, the use of surface active agents employed in conventional inks makes it difficult to perform stable recording with regard to the blurring and penetrability of ink on plain paper, because of mingled results some of which are good and some not. On the other hand, the use of the hydrazide compound can bring about very good results such that stable recording with less difference in quality depending on the types of recording paper can be achieved also when used in combination with a penetrant such as a surface active agent.

The reason therefor is that the hydrazide compounds have the properties of uniformly dissolving in an aqueous solution and, once water has disappeared, reacting with a dye having a carbonyl group. With utilization of such properties, the hydrazide compound is added in a water-based ink so that it is cross-linked with the dye on the recording paper, whereby any dependence of print quality level on recording paper can be eliminated and also fixing speed can be improved.

Components that constitute the ink of the present invention will be described below.

As a first ink according to the first embodiment of the ink of the present invention, the ink comprises a hydrazide compound, a pigment, an aqueous medium, and a water-soluble resin having a carbonyl group as the compound having at least one carbonyl group.

There are no particular limitations on the pigment so long as it can satisfy the functions required in conventional ink-jet recording inks. Particularly preferred examples thereof are shown below.

Carbon black used in black inks may preferably be carbon black produced by the furnace process or the channel process, having a primary particle diameter of from 15 to 40 mμ, a specific surface area of from 50 to 300m²/g as measured by the BET method, a DBP oil absorption of from 40 to 150 ml/100 g, a volatile component of from 0.5 to 10% and a pH value of from 2 to 9. For example, it is preferable to use commercially available products such as No.230, No.900, MCF88, No33, No.40, No.45, No.52, MA7, MA8, No.2200B (trade names; available from Mitsubishi Chemical Industries Limited), RAVEN1255 (trade name; available from Columbian Chemicals), REGAL400R, REGAL330R, REGAL660R, MOGUL L (trade names; available from Cabot Corp.), and Color Black FW1, Color Black FW18, Color Black S170, Color Black S150, Printex-35, Printex-U (trade names; available from Degussa, Inc.).

Pigments used in yellow inks may include C.I. Pigment Yellow 1, C.I. Pigment Yellow 2, C.I. Pigment Yellow 3, C.I. Pigment Yellow 13, C.I. Pigment Yellow 16 and C.I. Pigment Yellow 83, which can be preferably used.

Pigments used in magenta inks may include C.I. Pigment Red 5, C.I. Pigment Red 7, C.I. Pigment Red 12, C.I. Pigment Red 48(Ca), C.I. Pigment Red 48(Mn), Pigment Red 57(Ca), C.I. Pigment Red 112 and C.I. Pigment Red 122, which can be preferably used.

Pigments used in cyan inks may include C.I. Pigment Blue 1, C.I. Pigment Blue 2, C.I. Pigment Blue 3, C.I.

Pigment Blue 15:3, C.I. Pigment Blue 16, C.I. Pigment Blue 22, C.I. Vat Blue 4 and C.I. Vat Blue 6, which can be preferably used.

The pigment of the first ink of the present invention is by no means limited to the above commercially available products, and those newly produced may also be used.

The water-soluble resin having carbonyl groups functions as a dispersant of the pigment. Characteristic groups comprising the carbonyl group may include the carbonyl group itself, as well as carboxyl groups, ester bonds, amide bonds, ketone groups and urethane groups. Any water-soluble resins can be used so long as they have a —C=O bond. Those having a weight average molecular weight of from 1,000 to 30,000 are preferred. Those of from 3,000 to 15,000 are more preferred. They specifically include block copolymers, random copolymers and graft copolymers, and salts thereof, comprised of at least two monomers (at least one of which is a hydrophilic monomer) selected from the group consisting of styrene, styrene derivatives, vinyl naphthalene, vinyl naphthalene derivatives, aliphatic alcohol esters of $\alpha,\beta$-ethylenically unsaturated carboxylic acids, as well as acrylic acid, acrylic acid derivatives, maleic acid, maleic acid derivatives, itaconic acid, itaconic acid derivatives, fumaric acid, fumaric acid derivatives, vinyl acetate, vinylpyrrolidone, acrylamide and derivatives of these. Natural resins such as rosin, shellac and starch may also be used. These natural resins are alkali-soluble resins capable of being dissolved in an aqueous solution comprising a base dissolved therein.

The water-soluble resin described above may preferably be contained in an amount ranging from 0.1 to 5% by weight based on the total weight of the ink. It is more preferable for the ink to be prepared in neutrality or alkalinity as a whole. This is preferable for improving the solubility of the water-soluble resin and providing an ink having much superior long-term storage stability. In this instance, however, such an ink may cause corrosion of various members used in an ink-jet recording apparatus, and hence it should be adjusted in a pH range of from 7 to 10.

A pH adjustor used for such purpose may include, for example, various organic amines such as diethanolamine and triethanolamine, inorganic alkali agents including alkali metal hydroxides such as sodium hydroxide, lithium hydroxide and potassium hydroxide, organic acids and mineral acids.

The pigment and water-soluble resin as described above are dispersed or dissolved in an aqueous medium.

The aqueous medium may preferably include mixed solvents of water and water-soluble organic solvents.

The water should not be tap water containing various ions, and may preferably be ion-exchanged water (deionized water).

The water-soluble organic solvent used in mixture with water may include, for example, alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycols; alkylene glycols the alkylene group of which has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl or -ethyl ether, diethylene glycol methyl or ethyl ether and triethylene glycol monomethyl or -ethyl ether; N-methyl-2-pyrrolidone, 2-pyrrolidone, and 1,3-dimethyl-2-imidazolidinone. Of these many water-soluble organic solvents, polyhydric alcohols such as diethylene glycol and lower alkyl ethers of polyhydric alcohols such as ethylene glycol monomethyl or -ethyl ether are particularly preferred.

The water-soluble organic solvent in the ink of the present invention may usually be contained in an amount ranging from 3 to 50% by weight, and preferably in an amount ranging from 3 to 40% by weight, based on the total weight of the ink. The water may be in an amount ranging from 10 to 90% by weight, and preferably in an amount ranging from 30 to 80% by weight, based on the total weight of the ink.

In the present invention, the hydrazide compound incorporated into the ink for cross-linking it with carbonyl groups of the diapersant to form a film of non-volatile components may specifically include adipic acid dihydrazide, oxalic acid dihydrazide, carbohydrazide, polyacrylic acid hydrazide (which are available from Otsuka Chemical Co., Ltd.), and ACRONAL (trade name; available from Mitshbishi Yuka Badische Co., Ltd.).

The hydrazide compound may preferably be contained in the ink in an amount of from 0.1 to 10% by weight, and more preferably from 0.5 to 5% by weight. Any of these compounds used in an amount less than 0.1% by weight can not bring about an improvement in rub-off fastness of prints as intended in the present invention. On the other hand, its use in an amount more than 10% by weight may tend to cause ill effects such as clogging of the ejection orifices because of an increase in viscosity of the ink.

In addition to the components described above, a surface active agent, a defoamer, an antiseptic and so forth may be optionally added to the ink of the present invention so that the ink can have the desired values of physical properties. A commercially available water-soluble dye also may be added.

The ink of the present invention can be prepared in the following way: First, the pigment is added to an aqueous solution comprised of at least the water-soluble resin having carbonyl groups and water, followed by stirring. Thereafter, the pigment is dispersed in the solution by a dispersion means described later, optionally followed by centrifugal separation to obtain a desired dispersion. Next, to the resulting dispersion, the hydrazide compound described above is added, followed by stirring to provide ink. In instances in which the alkali-soluble resin such as natural resin is used, it is necessary to add a base in order to dissolve the resin.

The base added to the dispersion when the alkali-soluble resin is used may preferably include organic amines such as monoethanolamine, diethanolamine, triethanolamine, aminomethylpropanol and ammonia or inorganic bases such as potassium hydroxide and sodium hydroxide.

It is also effective to carry out premixing for 30 minutes or more before the aqueous solution containing the pigment is dispersed. This premixing enables improvement in wettability of the pigment surface to promote adsorption of resin on the pigment surface.

As for the dispersion means used in the present invention, it may be any of dispersion machines commonly used, including, for example, a ball mill, a roll mill and a sand mill. In particular, a high-speed sand mill is preferred, as exemplified by Super mill, Sand grinder, Beads mill, Agitator mill, Grain mill, Dyno mill, Pearl mill and Coball mill (all trade names).

In the present invention, a pigment with a desired particle size distribution can be obtained by a method in which a tumbling medium of the dispersion machine is made to have a small size, the tumbling medium is used in a large packing fraction, the dispersion is carried out for a long time, treated products are slowly discharged, or, after being pulverized, they are classified using a filter or a centrifugal separator. Any of these methods may also be used in combination.

As a second ink according to the first embodiment of the ink of the present invention, the ink comprises the hydrazide compound, an aqueous medium, and a dye having at least one carbonyl group as the compound having at least one carbonyl group.

The dye having at least one carbonyl group may include dyes having a carbonyl group, a carboxyl group, an ester bond, an amide bond, a ketone group, a urethane bond or the like, as exemplified by various dyes such as direct dyes, acid dyes, food dyes, basic dyes, reactive dyes, disperse dyes, vat dyes, soluble vat dyes, reactive disperse dyes and oil dyes. Of these dyes, water-soluble dyes are particularly preferred in view of performances of the ink.

The content of the dye in the ink depends on the types of liquid medium components, the properties required for the ink, and so forth. In usual instances, the dye may be contained in an amount of approximately from 0.2 to 20% by weight, preferably from 0.5 to 10% by weight, and more preferably from 1 to 5% by weight, based on the total weight of the ink.

As the aqueous medium, the same one as that in the first ink previously described may be used. In the second ink, the most preferable aqueous medium is composed of water and at least one organic solvent, where the organic solvent is at least one water-soluble organic solvent with a high boiling point as exemplified by polyhydric alcohols such as diethylene glycol, triethylene glycol, glycerol, 1,2,6-hexanetriol and thiodiglycol, and 2-pyrrolidone.

The water-soluble organic solvent and the water may be contained in the ink each in the same amount as in the case of the first ink.

As the hydrazide compound, the same compounds as those in the first ink can be used.

In addition to the components described above, various kind of diapersant, surface active agent, viscosity modifier, surface tension modifier, fluorescent brightener and so forth may be optionally added to the second ink of the present invention.

As the viscosity modifier, polyvinyl alcohol, celluloses, water-soluble resins or the like are suitable. As the surface active agent, all sorts of surface active agents of cationic, anionic and nonionic types can be used. As the surface tension modifier, diethanolamine and triethanolamine are suitable. Besides, pH adjustors using buffers, antifungal agents, and so forth may also be used.

In the case of inks applied in ink-jet recording in which the ink is electrostatically charged, a resistivity regulator including inorganic bases such as lithium chloride, ammonium chloride or sodium chloride is added.

In order to solve the problems of feathering and drying performance of recorded matter and penetrability and at the same time improve compatibility with ink-jet recording heads, the second ink of the present invention may preferably be adjusted to have, as physical properties of the ink itself, a surface tension of from 30 to 68 dyne/cm and a viscosity of 15 cP or less, and more preferably 5 cP or less, at 25° C.

Second Preferred Embodiment (Embodiment in which a compound having oxazolyl groups is used)

The ink of the present invention may also comprise a component having an oxazolyl group and a compound having at least one carbonyl group.

Use of the ink of the present embodiment makes it possible to obtain stable recorded images having a superior fixing speed or rub-off fastness and which are free from a decrease in print density. This is presumably because the compound having oxazolyl groups has the properties of uniformly dissolving in an aqueous solution and, once water has disappeared, reacting with the compound having at least one carbonyl group. More specifically, it is presumed that component (a) (the compound having oxazolyl groups) in the ink of the present embodiment is uniformly dissolved in the ink, and, once this ink has been ejected from an ink-jet recording head onto recording paper and has dried, the oxazolyl group possessed by component (a) and the carboxyl group possessed by component (b) (the compound having at least one carbonyl group) combine to form a cross-linked structure, which brings about a formation of a film of non-volatile components, whereby an improvement in rub-off fastness of prints can be achieved. It is also presumed that the cross-linking reaction uniformly takes place without regard to the types of paper, and hence any dependence of print quality on recording paper can be eliminated.

The component (a) used in the ink of the present embodiment comprises (a-1): a water-soluble resin having an oxazolyl group or (a-2): a fine particle having oxazolyl groups adsorbed on its outer surface. The component (a) may include oxazoline type reactive polymers. The oxazoline type reactive polymers are commercially available, including, for example, K-1000 series and K-2000 series acryl-styrene resins, RPS series styrene resins and RAS series acrylonitrile-styrene resins, produced by Nippon Shokubai Kagaku Kogyo Co., Ltd.

The water-soluble resin (a-1) refers to, for example, an oxazoline type reactive polymer having one or more oxazolyl groups represented by the formula

(1)

The fine particle (a-2) used in the present embodiment may include organic particles and inorganic particles without any particular limitations. Those insoluble in water and capable of being stably dispersed therein are preferred. There are also no particular limitations on particle diameter. Spherical particles may preferably be used. Stated specifically, the organic fine particles may include particles of polystyrene, styrene-acrylate copolymers, polymethyl methacrylate, melamine resins, epoxy resins, silicone resins, benzoguanamine resins, polyamide resins, fluorine resins, and polymers obtained by emulsion polymerization of α,β-unsaturated ethylenic monomers. The inorganic fine particles may include a large number of materials such as titanium dioxide particles, silica particles and alumina particles. As commercially available products, the organic fine particles may include MUTICLE series products, available from Mitsui Toatsu Chemicals, Inc.; ME series products, available from Soken Chemical & Engineering Go., Ltd.; JULIMER MB series products, available from Nihon Junyaku Co., Ltd.; TOSPEARL series products, available from Toshiba Silicone Co., Ltd.; EPOSTAR series products, available from Nippon Shokubai Kagaku Kogyo Go., Ltd.; MIGROGEL series products, available from Nippon Paint Co., Ltd.; and FLUON series products, available from Asahi Glass Go., Ltd. The inorganic fine particles may include titania series products, available from Indemitsu Kosan Go., Ltd.; and aluminum oxide C, available from Nippon Aerosil Go., Ltd. Their particle diameter may, depending on the nozzle diameter of a printer head used, be approximately from 0.01 to 5 μm, and preferably from 0.05 to 1.0 μm.

The fine particle (a-2) refers to a fine particle having at least one oxazolyl group adsorbed on its outer surface, as diagrammatically represented by the formula

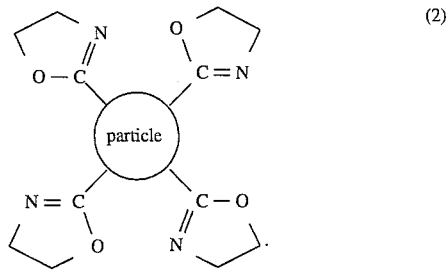

(2)

This component (a) should preferably be contained in the ink in an amount of from 0.1 to 10% by weight, and more preferably from 0.5 to 5% by weight. Its use in a content less than 0.1% by weight tends to result in an unsatisfactory improvement in rub-off fastness of prints. On the other hand, its use in a content more than 10% by weight tends to slightly cause clogging of ejection orifices because of an increase in viscosity of ink.

The compound (b) having at least one carbonyl group includes (b-1): a water-soluble resin having a carbonyl group and (b-2): a dye having a carbonyl group. Of these, the water-soluble resin (b-1) having a carbonyl group, mainly used in the case of a water-based pigment ink, acts as a dispersant. As the water-soluble resin (b-1), the same ones as those described in the first embodiment may be used. This water-soluble resin (b-1) should preferably be contained in the ink in an amount ranging from 0.1 to 5% by weight.

Of the compound (b) having a carbonyl group, used in the ink of the present embodiment, the dye (b-2) having a carbonyl group may include those having a carbonyl group without any particular limitations, as exemplified by direct dyes, acid dyes, food dyes, basic dyes, reactive dyes, disperse dyes, vat dyes, soluble vat dyes, reactive disperse dyes and oil dyes. Of these dyes, water-soluble dyes are particularly preferred in view of the performance of the ink.

The content of the dye (b-2) in the ink depends on the properties required for the ink, and so forth. In usual instances, the dye should be contained in an amount of approximately from 0.2 to 20% by weight, preferably from 0.5 to 10% by weight, and more preferably from 1 to 5% by weight, based on the total weight of the ink.

Pigment (c) is used when the ink of the present embodiment comprises a water-based pigment ink. As the pigment (c), the same ones as those previously described in the first embodiment may be used. It may be contained in the ink in an amount ranging from 1 to 2% by weight, and preferably from 2 to 12% by weight.

The ink of the present embodiment should preferably be an ink comprising the components (a), (b) and (c) detailed above which are dispersed or dissolved in a mixed solvent of water (d) and water-soluble organic solvent (e). The water (d) and the water-soluble organic solvent (e) may be the same ones as those described in the first embodiment.

The water (d) should preferably be contained in the ink in an amount of from 10 to 90% by weight, and preferably from 30 to 80% by weight. The water-soluble organic solvent (e) should preferably be contained in the ink in an amount of from 3 to 50% by weight, and preferably from 3 to 40% by weight.

It is more preferable for the ink to be prepared in neutrality or alkalinity as a whole. This is preferable, for example, for improving the solubility of the water-soluble resin (c) and providing an ink having much superior long-term storage stability. In this instance, however, such an ink may cause corrosion of various members used in ink-jet recording apparatus, and hence it should be adjusted in a pH range of from 7 to 10. A pH adjustor used therefor may include, for example, various organic amines such as monoethanolamine, diethanolamine and triethanolamine, inorganic bases such as sodium hydroxide, lithium hydroxide and potassium hydroxide, and other organic acids and mineral acids.

In addition to the components (a) to (e) described above, various optional components may be added to the ink of the present embodiment as occasion cells. For example, a surface active agent, a defoamer, an antiseptic, a dispersant, a viscosity modifier, a surface tension modifier, a fluorescent brightener, a water-soluble dye (including dyes having no carboxyl group) and so forth may be added. The viscosity modifier may include polyvinyl alcohol, celluloses and water-soluble resins. The surface active agent may include all sorts of surface active agents of cationic, anionic and nonionic types. The surface tension modifier may include diethanolamine and triethanolamine. Besides, pH adjustors using buffers, antifungal agents, and so forth may also be used. In order to prepare inks applied in ink-jet recording in which the ink is electrostatically charged, a resistivity regulator including inorganic bases such as lithium chloride, ammonium chloride or sodium chloride may be added.

In order to solve the problems of feathering and drying performance of recorded matter and penetrability and at the same time improve compatibility with ink-jet recording heads, the ink of the present embodiment may preferably be adjusted to have, as physical properties of the ink itself, a surface tension of from 30 to 68 dyne/cm and a viscosity of 15 cP or less, and more preferably 5 cP or less, at 25° C.

The ink of the present embodiment can be prepared by a method in which, in the case of, for example, the dye ink, the respective components are well mixed and thereafter the pH is optionally adjusted, followed by filtration under pressure.

In the case of, for example, the water-based pigment ink, it can be prepared in the following way: The pigment (c) is added to an aqueous solution comprised of at least the water-soluble resin (b-1) and water, followed by stirring. Thereafter, the pigment is dispersed in the solution by a dispersion means described later, optionally followed by centrifugal separation to obtain a desired pigment dispersion. Next, to the resulting dispersion, the resective components described above are added, followed by stirring. It is also effective to carry out premixing for 30 minutes or more before the aqueous solution containing the pigment (c) is dispersed. This premixing enables improvement in wettability of the pigment surface to promote adsorption of resin on the pigment surface. As the dispersion means used for dispersion, any of dispersion machines commonly used can be used, including, for example, a ball mill and a sand mill. In particular, a high-speed sand mill is preferred, as exemplified by Super mill, Sand grinder, Beads mill, Agitator mill, Grain mill, Dyno mill, Pearl mill and Coball mill (all trade names).

A pigment (c) with a desired particle size distribution can be obtained by a method in which a tumbling medium of the dispersion machine is made to have a small size, the tumbling medium is used in a large packing fraction, the dispersion is carried out for a long time, treated products are slowly discharged, or, after being pulverized, they are classified using a filter or a centrifugal separator. Any of these methods may also be used in combination.

When ink-jet recording is carried out using the ink of the present invention, it is suitable to use an apparatus in which heat energy corresponding to recording signals is imparted to the ink in a recording head so that ink droplets are generated by the action of the heat energy.

Figure 1B:
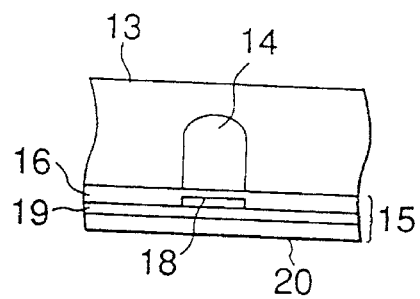
FIG. 1B is a cross section along the line A–B in FIG. 1A.
Figure 2:
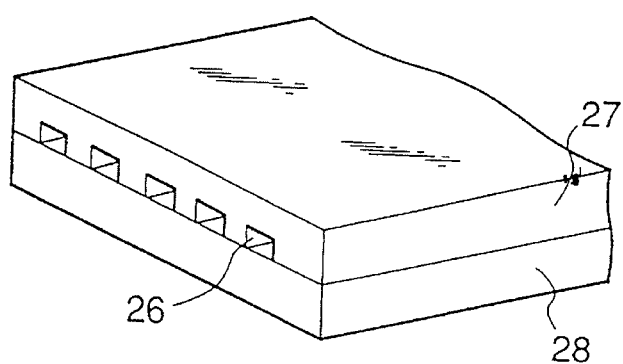
FIG. 2 is a perspective illustration of an embodiment of a recording head having ink ejection orifices in a large number.

FIGS. 1A, 1B and 2 show examples of the construction of the head, which is a main component of such an ink-jet recording apparatus. FIG. 1A is a partial cross section of a recording head 13 along its ink flow path, and FIG. 1B is a partial cross section along the line A–B in FIG. 1A. The recording head 13 is formed by bonding a glass, ceramic or plastic plate or the like having a channel 14 through which ink is passed, to a heating head 15 used in thermal recording (the drawing shows a thin-film head, to which, however the invention, is not limited).

The heating head 15 is comprised of a protective film 16 formed of silicon oxide or the like, aluminum electrodes 17-1 and 17-2, a heating resistor layer 18 formed of nichrome or the like, a heat accumulating layer 19, and a substrate 20 with good heat dissipation properties. The ink 21 reaches an ejection orifice (a minute opening) 22 and a meniscus 23 is formed there by a pressure P. Upon application of electric signals to the electrodes 17-1 and 17-2, heat is abruptly generated at the region denoted by n in the thermal head 15, so that bubbles are generated in the ink 21 coming into contact with this region. The pressure thus produced thrusts out the meniscus 23 and the ink 21 is ejected from the orifice 22 in the form of minute recording drops 24 to fly against a recording medium 25. FIG. 2 is a partial perspective view of a multi-head comprising the head as shown in FIGS. 1A and 1B, arranged in a large number. The multi-head is prepared by bonding a glass plate 27 having a multi-channel 26, to a heating head 28 similar to the head as illustrated in FIG. 1A.

Figure 3:
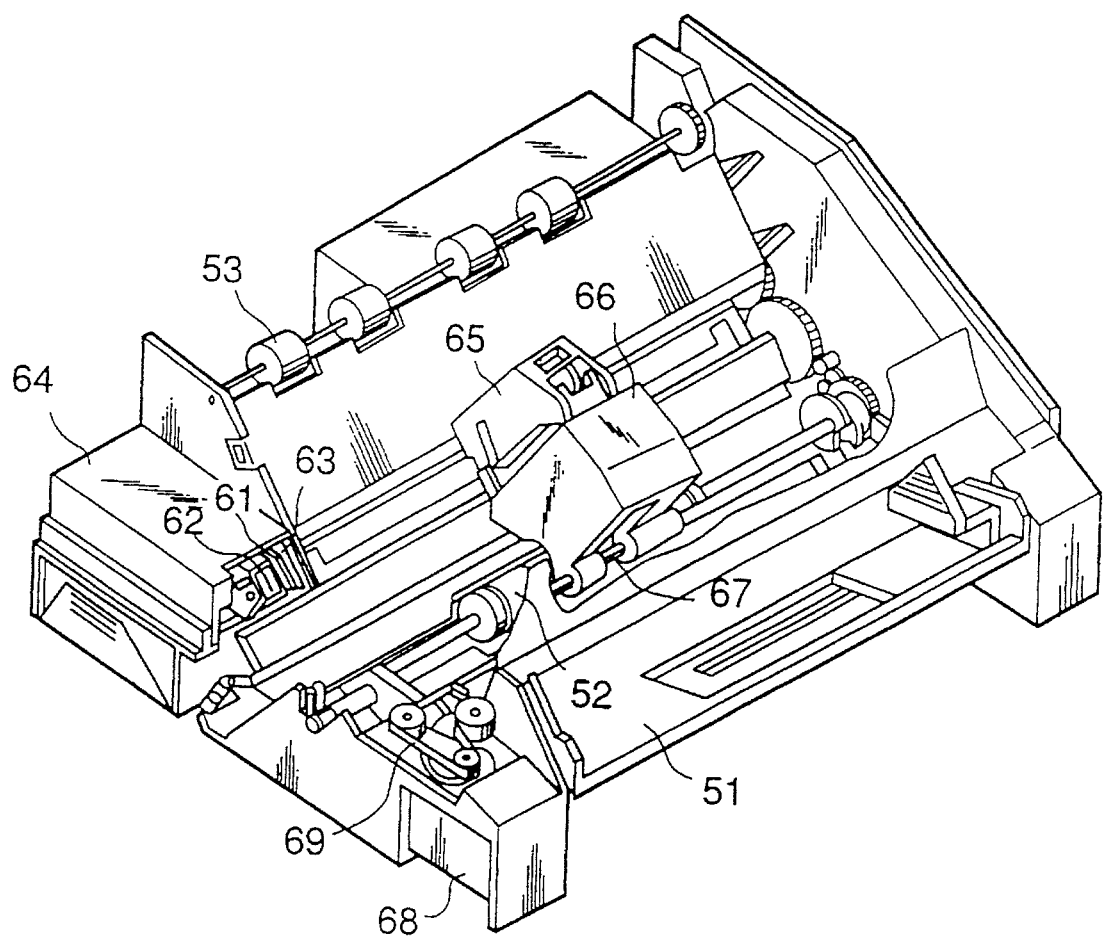
FIG. 3 is a perspective illustration of an embodiment of an ink-jet recording apparatus suited for the present invention

FIG. 3 is a perspective view to show an example of an ink-jet recording apparatus in which such a head has been incorporated. In FIG. 3, reference numeral 61 denotes a blade serving as a wiping member in the form of a cantilever, one end of which is a stationary end retained by a blade-retaining member. The blade 61 is provided at the position adjacent to the region in which a recording head makes a record. In the present example, the blade is retained in such a form that it projects to the course through which the recording head is moved. Reference numeral 62 denotes a cap, which is provided at the home position adjacent to the blade 61, and is so constituted that it moves in the direction perpendicular to the direction in which the recording head is moved and comes into contact with the face of ejection openings to carry out capping. Reference numeral 63 denotes an ink absorber provided adjoiningly to the blade 61, and, similar to the blade 61, is retained in such a form that it projects to the course through which the recording head is moved. The above blade 61, cap 62 and absorber 63 constitute an ejection restoration assembly 64, where the blade 61 and the absorber 63 remove the water, dust or the like from the ink ejection opening face. Reference numeral 65 denotes the recording head having an ejection energy generating means and ejects ink to the recording medium set opposite to the ejection opening face provided with ejection openings, to carry out recording. Reference numeral 66 denotes a carriage on which the recording head 65 is mounted so that the recording head 65 can be moved. The carriage 66 is slidably associated with a guide shaft 67. Part of the carriage 66 is connected (not shown) with a belt 69 driven by a motor 68. Thus, the carriage 66 can be moved along the guide 67 and hence the recording head 65 can be moved from a recording region to a region adjacent thereto.

Reference numeral 51 denotes a paper feeding part from which recording mediums are inserted, and 52, a paper feed roller driven by a motor (not shown). With such construction, the recording medium is fed to the position opposite to the ejection opening face of the recording head, and, with the progress of recording, is outputted from a paper output section provided with a paper output roller.

In the above constitution, the cap 62 of the head restoration assembly 64 is receded from the moving course of the recording head 65 when the recording head 65 is returned to its home position, e.g., after completion of recording, and the blade 61 stands projected to the moving course. As a result, the ejection opening face of the recording head 65 is wiped. When the cap 62 comes into contact with the ejection opening face of the recording head 65 to carry out capping, the cap 62 is moved in such a way that it projects to the moving course of the recording head.

When the recording head 65 is moved from its home position to the position at which recording is started, the cap 62 and the blade 61 are at the same position as the position where the ejection opening face is wiped. As a result, the ejection opening face of the recording head 65 is wiped also at the time of this movement.

The above movement of the recording head to its home position is made not only at the time of the completion of recording or restoration of ejection, but also when the recording head is moved between recording regions for the purpose of recording, during which it is moved to the home position adjacent to each recording region at given intervals, where the ejection opening face is wiped in accordance with this movement.

Figure 4:
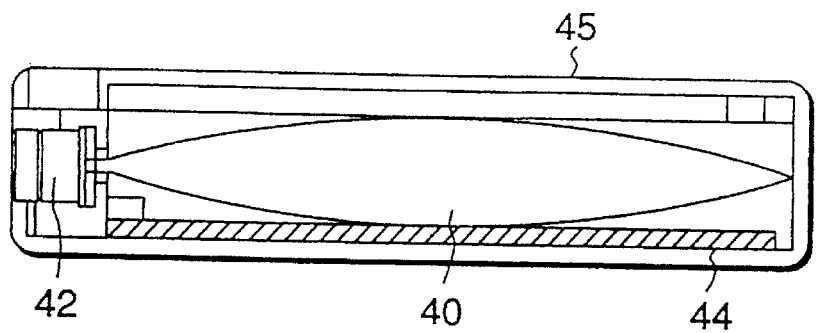
FIG. 4 is a sectional side elevation to show an embodiment of an ink cartridge.

FIG. 4 is a cross-sectional view to show an example of an ink cartridge, denoted as 45, that has held the ink being fed to the head through an ink-feeding tube. Herein reference numeral 40 denotes a bag that has held the feeding ink. The top thereof is provided with a stopper 42 made of rubber. A needle (not shown) may be inserted into this stopper 42 so that the ink in the ink holder 40 can be fed to the head. Reference numeral 44 denotes an absorber that receives a waste ink.

Figure 5:
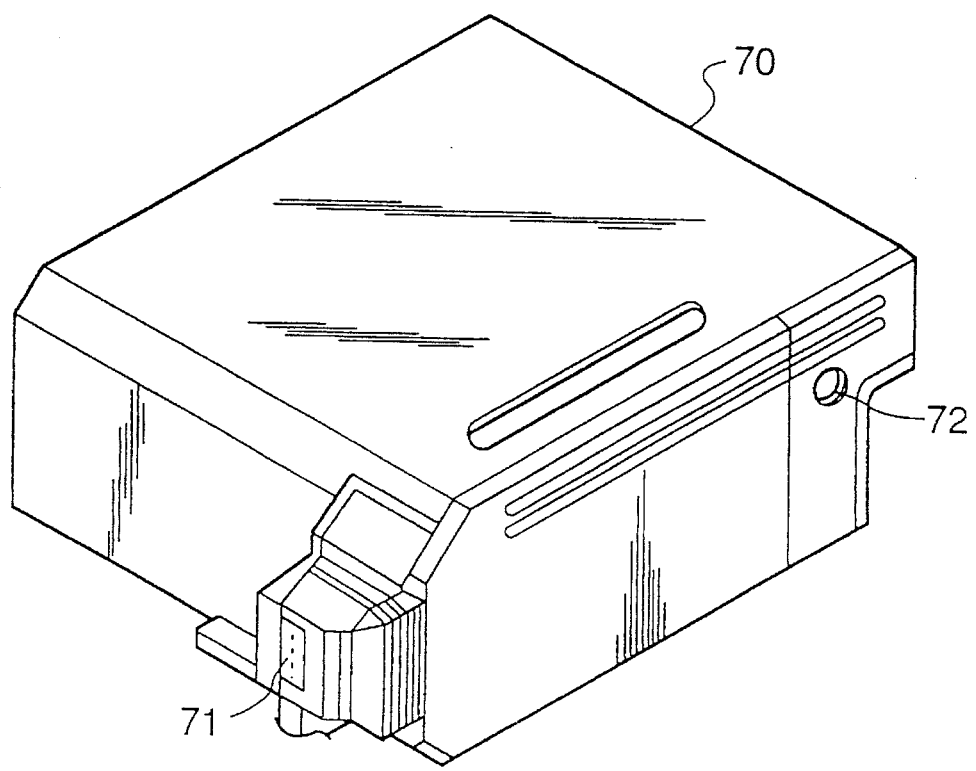
FIG. 5 is a perspective view to show an embodiment of a recording unit.

The ink-jet recording apparatus used in the present invention is not limited to the apparatus as described above in which the head and the ink cartridge are separately provided, and a device can also be preferably used in which these are integrally formed as shown in FIG. 5. In FIG. 5, reference numeral 70 denotes an ink cartridge (a recording unit), in the interior of which an ink absorber impregnated with ink is held. The ink cartridge is so constructed that the ink in such an ink absorber is ejected in the form of ink droplets from a head 71 having a plurality of orifices. Reference numeral 72 denotes an air path opening through which the interior of the cartridge is made to communicate with the atmosphere. This ink cartridge 70 can be used in place of the recording head 65 shown in FIG. 3, and is detachably mounted to the carriage 66.

EXAMPLES

The present invention will be described below by giving Examples and Comparative Examples. In the following, "part(s)" indicates "part(s) by weight" unless particularly noted.

First Embodiment

Example 1

(1) Preparation of ink:

a. Preparation of pigment dispersion:

| | |
|---|---|
| Styrene/acrylic acid/ethyl acrylate copolymer (acid value: 140; weight average molecular weight: 5,000) | 1.5 parts |
| Monoethanolamine | 1 part |
| Ion-exchanged water | 81.5 parts |
| Diethylene glycol | 5 parts. |

The above components were mixed, and the mixture was heated to 70° C. on a water bath to completely dissolve the resin component. To the resulting solution, 10 parts of carbon black (MCF88, available from Mitsubishi Chemical Industries Limited) and 1 part of isopropyl alcohol were added, followed by premixing for 30 minutes, and thereafter the mixture obtained was dispersed under conditions shown below.

Dispersion machine: Sand grinder (manufactured by Igarashi Kikai K.K.)

Tumbling media: Zirconium beads of 1 mm diameter

Tumbling media packing fraction: 50% (by volume)

Pulverizing time: 3 hours.

Centrifugal separation was further carried out (12,000 rpm; for 20 minutes) to remove coarse particles. Thus, dispersion 1 was formed.

b. Preparation of ink:

| | |
|---|---|
| Dispersion 1 | 30 parts |
| Glycerol | 10 parts |
| Ethylene glycol | 5 parts |
| N-methylpyrrolidone | 5 parts |
| Ethyl alcohol | 2 parts |
| Adipic acid dihydrazide (available from Otsuka Chemical Co., Ltd.) | 2 parts |
| Ion-exchanged water | 46 parts. |

The above components were mixed to obtain an ink.

(2) Recording:

The ink formulated as shown above was tested using an ink-jet recording apparatus having an on-demand type multi-recording head capable of imparting heat energy corresponding to recording signals to thereby effect ink droplets.

Example 2

(1) Preparation of ink:

a. Preparation of pigment dispersion:

| | |
|---|---|
| Styrene/maleic acid/maleic acid half ester copolymer (acid value: 70; weight average molecular weight: 12,000) | 4 parts |
| Aminomethyl propanol | 2 parts |
| Ion-exchanged water | 74 parts |
| Diethylene glycol | 5 parts. |

The above components were mixed, and the mixture was heated to 70° C. on a water bath to completely dissolve the resin component. To the resulting solution, 15 parts of carbon black (MCF88, available from Mitsubishi Chemical Industries Limited) was added, followed by premixing for 30 minutes, and thereafter the mixture obtained was dispersed under conditions shown below.

Dispersion machine: Pearl mill (manufactured by Ashizawa K. K.)

Tumbling media: Glass beads of 1 mm diameter

Tumbling media packing fraction: 50% (by volume)

Discharge rate: 100 ml/min.

Centrifugal separation was further carried out (12,000 rpm; for 20 minutes) to remove coarse particles. Thus, dispersion 2 was formed.

b. Preparation of ink:

| | |
|---|---|
| Dispersion 2 | 30 parts |
| Glycerol | 8 parts |
| Ethylene glycol | 5 parts |
| Ethanol | 5 parts |
| Oxalic acid dihydrazide (available from Otsuka Chemical Co., Ltd.) | 1 part |
| Ion-exchanged water | 51 parts. |

The above components were mixed, and aminomethyl propanol was added to adjust the pH value to 8 to 10.

(2) Recording:

The ink thus formulated was tested in the same manner as in Example 1.

Example 3

(1) Preparation of ink:

a. Preparation of pigment dispersion:

| | |
|---|---|
| α-Methylstyrene/methyl acrylate/acrylic acid copolymer (acid value: 95; weight average molecular weight: 8,000) | 2.0 parts |
| Ion-exchanged water | 81.0 parts |
| Ethylene glycol | 5 parts. |

The above components were mixed, and the mixture was heated to 70° C. on a water bath to completely dissolve the resin component. To the resulting solution, 11 parts of carbon black (S170, available from Degussa, Inc.) and 1 part of isopropyl alcohol were added, followed by premixing for 60 minutes, and thereafter the mixture obtained was dispersed under conditions shown below.

Dispersion machine: Sand grinder (manufactured by Igarashi Kikai K. K.)

Tumbling media: Zirconium beads of 0.5 mm diameter

Tumbling media packing fraction: 70% (by volume)

Pulverizing time: 10 hours.

Centrifugal separation was further carried out (12,000 rpm; for 20 minutes) to remove coarse particles. Thus, dispersion 3 was formed.

b. Preparation of ink:

| | |
|---|---|
| Dispersion 3 | 30 parts |
| Glycerol | 12 parts |
| Diethylene glycol | 10 parts |
| 2-Pyrrolidone | 5 parts |
| ACRONAL YJ-6380D (trade name; available from from Mitshbishi Yuka Badische Co., Ltd.) | 0.5 part |
| Ion-exchanged water | 42.5 parts. |

The above components were mixed to obtain an ink.

(2) Recording:

The ink thus formulated was tested in the same manner as in Example 1.

Comparative Examples 1 to 3

Examples 1 to 3 were respectively repeated to prepare inks, except that no hydrazide compound was added and ion-exchanged water was instead added. Using inks thus obtained, recording tests were carried out in the same manner as in Examples 1 to 3.

Evaluation of ink and prints:

Prints obtained by printing characters on Canon NP-DRY copy paper according to the above method were evaluated in the following way. Results obtained are shown in Table 1.

(1) Print density of prints:

Print density of prints was measured using a Macbeth densitometer (TR918).

(2) Ink drying time:

Printed areas were rubbed with filter paper (trade name: No. 5C; available from Toyo Roshi K. K.), and the time taken until the printed areas no longer blurred was measured.

(3) Rub-off fastness:

Prints were rubbed with a highlighter pen. An instance in which no prints blurred when rubbed 5 times was evaluated as "A"; an instance in which prints blurred in 5 times but no print blurred when rubbed 3 times, as "B"; and an instance in which prints blurred when rubbed once, as "C".

TABLE 1

|  | Print density | Drying time (sec) | | Rub-off fastness |
| --- | --- | --- | --- | --- |
|  |  | Solid print | Characters |  |
| Example: |  |  |  |  |
| 1 | 1.40 | 30 | 10 | A |
| 2 | 1.38 | 32.5 | 12.5 | A |
| 3 | 1.37 | 35 | 15 | A |
| Comparative Example: |  |  |  |  |
| 1 | 1.30 | 60 | 35 | C |
| 2 | 1.29 | 65 | 40 | C |
| 3 | 1.29 | 75 | 45 | C |

Examples 4 to 9

To prepare inks A to F, components as respectively shown below were mixed and stirred for 5 hours. Thereafter, an aqueous 0.1% sodium hydroxide solution was added to adjust the pH to 7.5, followed by filtration under pressure using a membrane filter with a pore size of 0.22 μm (trade name: Fluoro pore filter; available from Sumitomo Electric Industries, Ltd.). Thus, inks A to F of the present invention were obtained.

| Composition of ink A: | |
| --- | --- |
| C.I. Direct Yellow 44 | 2 parts |
| Diethylene glycol | 15 parts |
| Adipic acid dihydrazide (available from Otsuka Chemical Co., Ltd.) | 3 parts |
| Water | 80 parts. |
| Composition of ink B: | |
| C.I. Direct Red 26 | 2 parts |
| Glycerol | 10 parts |
| Ethylene glycol | 5.5 parts |
| Oxalic acid dihydrazide (available from Otsuka Chemical Co., Ltd.) | 2 parts |
| Water | 80.5 parts. |
| Composition of ink C: | |
| C.I. Food Black 1 | 3 parts |
| Triethylene glycol | 10 parts |
| N-methyl-2-pyrrolidone | 3 parts |
| Carbohydrazide (available from Otsuka Chemical Co., Ltd.) | 1 part |
| Water | 83 parts. |
| Composition of ink D: | |
| C.I. Direct Blue 149 | 2.5 parts |
| 1,2,6-Hexanetriol | 5 parts |
| Diethylene glycol | 10 parts |
| ACRONAL YJ-63680D (trade name; available from Mitshbishi Yuka Badische Co., Ltd.) | 3 parts |
| Water | 79.5 parts. |
| Composition of ink E: | |
| HI12286 (available from ICI) | 2 parts |
| Thiodiglycol | 6 parts |
| Diethylene glycol | 9 parts |
| Adipic acid dihydrazide (available from Otsuka Chemical Co., Ltd.) | 3 parts |
| ACETYLENOL EH (trade name; available from Kawaken Fine Chemicals Co., Ltd.) | 0.5 part |
| Water | 79.5 parts. |
| Composition of ink F: | |
| C.I. Acid Green 34 | 3 parts |
| Ethylene glycol | 8 parts |
| Diethylene glycol | 7 parts |
| Oxalic acid dihydrazide (available from Otsuka Chemical Co., Ltd.) | 1 part |
| Ethylene glycol monobutyl ether | 1 part |
| Water | 80 parts. |

Comparative Examples 4 to 9

Inks G to L were prepared in the same manner as in Examples 4 to 9, respectively, except that no hydrazide compound was used.

Using the inks prepared in Examples 4 to 9 and Comparative Examples 4 to 9, recording was carried out to obtain prints, which were then evaluated in the following way. Results obtained are shown together in Table 2.

(1) Evaluation of drying time: Characters were printed on commercially available copy paper and bond paper, and the printed areas were rubbed with filter paper (trade name: No. 5C; available from Toyo Roshi K. K.) after 5 seconds, 10 seconds, 20 seconds and 30 seconds. Evaluation was made in the following way. The evaluation was made in an environment of 25° C., 60% RH.

AA: No blur when rubbed after 5 seconds

A: No blur when rubbed after 10 seconds

B: No blur when rubbed after 20 seconds

C: Blurred when rubbed after 30 seconds (2) Occurrence of blurring:

To examine the occurrence of blurring, 300 dots were continuously printed using a printer on commercially available copy paper and bond paper in a manner such that they did not touch one another, and were left to stand for 1 hour or more. Thereafter, the number of dots having caused blurring was counted on a microscope, and its proportion to the whole dot number was indicated in % to make an evaluation in the following way. The evaluation was made in an environment of 25° C., 60% RH.

A: 10% or less

B: 11 to 30%

C: 31% or more (3) Anti-clogging:

Anti-clogging refers to the lack of clogging of ejection orifices that may occur when printing is again started after a pause. The ink holder of a printer was filled with a given ink and alphabet and numeral characters were continuously printed for 10 minutes. Thereafter, printing was stopped and the printer was left to stand for 10 minutes in an uncapped state and thereafter alphabet and numeral characters were printed, where any faulty prints such as blurred or broken characters were examined to make an evaluation. The evaluation was made in an environment of 25° C., 60% RH.

A: No faulty prints occur on the first and subsequent characters.

B: Characters partly blur or break from the first.

C: Characters can not be printed at all from the first.

(4) Frequency response:

Resulting prints were observed with the naked eye to examine the state of prints, i.e., any blurs or blank areas and defective ink-droplet impact such as a splash or slippage, and an evaluation was made in the following way.

AA: Ink continuity to frequencies is good, and no blurs or white areas and defective ink-droplet impact are seen in both solid prints and character prints.

A: Ink continuity to frequencies is substantially good, and no blurs or white areas and defective ink-droplet impact are seen in character prints, but blurs are slightly seen in solid prints.

B: No blurs or white areas are seen in character prints, but a defective ink-droplet impact is partly seen. In solid prints, blurs or white areas are seen in about ⅓ of the solid prints.

C: Many blurs or white areas are seen in solid prints, and blurs or defective ink-droplet impact are seen in a large number in character prints.

The present invention also makes it possible to obtain an ink with a good safety even in its use in offices and homes.

Second Embodiment

The second embodiment will be described below by giving Examples 10 to 12 and Comparative Examples 10 to 12 relating to water-based pigment inks.

Example 10

Preparation of pigment dispersion:

| | |
|---|---|
| Styrene/acrylic acid/ethyl acrylate copolymer (acid value: 140; weight average molecular weight: 5,000) | 1.5 parts |
| Monoethanolamine | 1 part |
| Ion-exchanged water | 81.5 parts |
| Diethylene glycol | 5 parts. |

The above components were mixed, and the mixture was heated to 70° C. on a water bath to completely dissolve the resin component. To the resulting solution, 10 parts of carbon black (MCF88, available from Mitsubishi Chemical Industries Limited) and 1 part of isopropyl alcohol were added, followed by premixing for 30 minutes, and thereafter the mixture obtained was dispersed. In this dispersion treatment, Sand grinder (manufactured by Igarashi Kikai K. K.) was used as a dispersion machine, where zirconium beads of 1 mm diameter were used as the tumbling media in a tumbling media packing fraction of 50% by volume, and pulverization was carried out for 3 hours. Centrifugal sepa-

TABLE 2

| | | Drying time | | Blurring | | | |
|---|---|---|---|---|---|---|---|
| | Ink | Copy paper | Bond paper | Copy paper | Bond paper | Anti-clogging | Frequency response |
| Example: | | | | | | | |
| 4 | (A) | A | A | A | A | A | A |
| 5 | (B) | A | A | A | A | A | A |
| 6 | (C) | A | A | A | A | A | A |
| 7 | (D) | A | A | A | A | A | A |
| 8 | (E) | AA | AA | A | A | A | A |
| 9 | (F) | AA | AA | A | A | A | A |
| Comparative Example: | | | | | | | |
| 4 | (G) | C | B | B | B | B | B |
| 5 | (H) | B | B | B | B | B | B |
| 6 | (I) | B | B | B | B | B | B |
| 7 | (J) | B | B | B | B | B | B |
| 8 | (K) | AA | AA | C | C | A | A |
| 9 | (L) | AA | AA | C | C | A | A |

As described above, the use of the ink according to the present invention brings about an improvement in rub-off fastness of prints and fixing speed, and also can eliminate any uneven print densities ascribable to the types of recording paper, making it possible to obtain stable recorded images. The ink is also effective for solving various problems without causing the deterioration of performances such as ejection stability of the ink, anti-clogging at head tips and maintenance of print quality.

The ink of the present invention enables good recording free from blurring, with a superior quality level and with a good fixing performance also on plain paper such as paper for copying, paper for reporting, notepaper, letter paper, bond paper and computer printout paper commonly used in offices and so forth.

ration was further carried out at 12,000 rpm for 20 minutes to remove coarse particles. Thus, a dispersion was formed.

Preparation of ink:

| | |
|---|---|
| Pigment dispersion shown above | 30 parts |
| Glycerol | 10 parts |
| Ethylene glycol | 5 parts |
| N-methylpyrrolidone | 5 parts |
| Ethyl alcohol | 2 parts |
| K-1010E (trade name; available from Nippon Shokubai Kagaku Kogyo Co., Ltd.) | 2 parts |
| Ion-exchanged water | 46 parts. |

The above components were mixed to obtain an ink.

Example 11

Preparation of pigment dispersion:

| | |
|---|---|
| Styrene/maleic acid/maleic acid half ester copolymer (acid value: 70; weight average molecular weight: 1,200) | 4 parts |
| Aminomethyl propanol | 2 parts |
| Ion-exchanged water | 74 parts |
| Diethylene glycol | 5 parts. |

The above components were mixed, and the mixture was heated to 70° C. on a water bath to completely dissolve the resin component. To the resulting solution, 15 parts of carbon black (MC88, available from Mitsubishi Chemical Industries Limited) was added, followed by premixing for 30 minutes, and thereafter the mixture obtained was dispersed. In this dispersion treatment, Pearl mill (manufactured by Ashizawa K. K.) was used as a dispersion machine, where glass beads of 1 mm diameter were used as tumbling media in a tumbling media packing fraction of 50% by volume under a discharge rate of 100 ml/min. Centrifugal separation was further carried out at 12,000 rpm for 20 minutes to remove coarse particles. Thus, a dispersion was formed.

Preparation of ink:

| | |
|---|---|
| Pigment dispersion shown above | 30 parts |
| Glycerol | 8 parts |
| Ethylene glycol | 5 parts |
| Ethanol | 5 parts |
| RPS-1001 (trade name; available from Nippon Shokubai Kagaku Kogyo Co., Ltd.) | 1 part |
| Ion-exchanged water | 51 parts. |

The above components were mixed, and aminomethyl propanol was added to adjust the pH value to 8 to 10. Thus, an ink was obtained.

Example 12

Preparation of pigment dispersion:

| | |
|---|---|
| α-Methylstyrene/methyl acrylate/acrylic acid copolymer (acid value: 95; weight average molecular weight: 8,000) | 2.0 parts |
| | 2.0 parts |
| Ion-exhanged water | 81.0 parts |
| Ethylene glycol | 5 parts. |

The above components were mixed, and the mixture was heated to 70° C. on a water bath to completely dissolve the resin component. To the resulting solution, 11 parts of carbon black (S170 available from Degussa, Inc.) and 1 part of isopropyl alcohol were added, followed by premixing for 60 minutes, and thereafter the mixture obtained was dispersed. In this dispersion treatment, Sand grinder (manufactured by Igarashi Kikai K. K.) was used as a dispersion machine, where zirconium beads of 0.5 mm diameter were used as tumbling media in a tumbling media packing fraction of 70% by volume, and pulverization was carried out for 100 hours. Centrifugal separation was further carried out at 12,000 rpm for 20 minutes to remove coarse particles. Thus, a dispersion was formed.

Preparation of ink:

| | |
|---|---|
| Pigment dispersion shown above | 30 parts |
| Glycerol | 12 parts |
| Diethylene glycol | 10 parts |
| 2-Pyrrolidone | 5 parts |
| CX-K2010E (trade name; available from Nippon Shokubai Kagaku Kogyo Co., Ltd.) | 0.5 part |
| Ion-exchanged water | 42.5 parts. |

The above components were mixed to obtain an ink.

Comparative Examples 10 to 12

Examples 10 to 12 were respectively repeated to prepare inks, except that no compound having an oxazolyl group was added and ion-exchanged water was instead added in the same amount.

Evaluation of ink:

Using each ink, characters were printed on copy paper (NP-DRY copy paper, available from Canon Inc.) using an ink-jet recording apparatus having an on-demand type multi-recording head capable of imparting heat energy corresponding with recording signals to thereby eject ink droplets. The print density, drying time and rub-off fastness of prints were evaluated in the same manner as in Examples 1 to 3. Results obtained are shown in Table 3.

TABLE 3

| | Print density | Drying time (sec) | | Rub-off fastness |
|---|---|---|---|---|
| | | Solid print | Characters | |
| Example: | | | | |
| 10 | 1.40 | 30 | 10 | A |
| 11 | 1.38 | 32.5 | 12.5 | A |
| 12 | 1.39 | 32.5 | 12.5 | A |
| Comparative Example: | | | | |
| 10 | 1.30 | 60 | 35 | C |
| 11 | 1.29 | 70 | 40 | C |
| 12 | 1.29 | 75 | 45 | C |

As is seen from the results shown in Table 3, the inks of Examples 10 to 12, compared with the inks of Comparative Examples 10 to 12, show superior print density, drying time and rub-off fastness because of the compound having oxazolyl groups contained therein.

The second embodiment will be further described below by giving Examples 13 to 18 and Comparative Examples 13 to 18 relating to dye inks.

Examples 13 to 18

Components respectively shown below were mixed and stirred for 5 hours. Thereafter, a 0.1% sodium hydroxide aqueous solution was added to adjust the pH value to 7.5, followed by filtration under pressure using a membrane filter with a pore size of 0.22 μm (trade name: Fluoro pore filter; available from Sumitomo Electric Industries, Ltd.). Thus, inks of the present invention were obtained.

(Example 13)

| | |
|---|---|
| C.I. Direct Yellow 41 | 2 parts |
| Diethylene glycol | 15 parts |
| K-1010E (trade name; available from Nippon Shokubai Kagaku Kogyo Co., Ltd.) | 3 parts |

| Ion-exchanged water | 80 parts. |
|---|---|
| (Example 14) | |
| C.I. Direct Black 51 | 3 parts |
| Triethylene glycol | 10 parts |
| N-methyl-2-pyrrolidone | 3 parts |
| RPS-1001 (trade name; available from Nippon Shokubai Kagaku Kogyo Co., Ltd.) | 1 part |
| Ion-exchanged water | 83 parts. |
| (Example 15) | |
| C.I. Direct Blue 149 | 2.5 parts |
| 1,2,6-Hexanetriol | 5 parts |
| Diethylene glycol | 10 parts |
| CX-K2010E (trade name; available from Nippon Shokubai Kagaku Kogyo Co., Ltd.) | 3 parts |
| Ion-exchanged water | 79.5 parts. |
| (Example 16) | |
| HI12286 (available from ICI Co.) | 2 parts |
| Thiodiglycol | 6 parts |
| Diethylene glycol | 9 parts |
| K-1020E (trade name; available from Nippon Shokubai Kagaku Kogyo Co., Ltd.) | 3 parts |
| ACETYLENOL EH (trade name; available from Kawaken Fine Chemicals Co., Ltd.) | 0.5 parts |
| Ion-exchanged water | 79.5 parts. |
| (Example 17) | |
| C.I. Direct Black 174 | 3 parts |
| Ethylene glycol | 8 parts |
| Diethylene glycol | 7 parts |
| RAS-1005 (trade name; available from Nippon Shokubai Kagaku Kogyo Co., Ltd.) | 1 part |
| Ethylene glycol monobutyl ether | 1 part |
| Ion-exchanged water | 80 parts. |
| (Example 18) | |
| C.I. Acid Green 34 | 3 parts |
| Ethylene glycol | 8 parts |
| Triethylene glycol | 7 parts |
| K-10120E (trade name; available from Nippon Shokubai Kagaku Kogyo Co., Ltd.) | 3 parts |
| Triethylene glycol monobutyl ether | 1 part |
| Ion-exchanged water | 78 parts. |

Comparative Examples 13 to 18

Examples 13 to 18 were respectively repeated to prepare inks, except that no compound having an oxazolyl group was added and ion-exchanged water was instead added in the same amount.

Evaluation of ink:

Each ink was poured into an ink cartridge for an ink-jet printer (trade name: BJ-10 V, manufactured by Canon Inc.) making use of a heating element as an energy source for ink ejection. Using this printer, recording was carried out on commercially available copy paper and bond paper. Drying time of prints, occurrence of blurring, anti-clogging and frequency response were evaluated in the same manner as in Examples 4 to 9. Results obtained are shown in Table 4.

TABLE 4

| | Drying time | | Blurring | | Anti- | Fre- |
|---|---|---|---|---|---|---|
| | Copy paper | Bond paper | Copy paper | Bond paper | clog- ging | quency response |
| Example: | | | | | | |
| 13 | A | A | A | A | A | A |
| 14 | A | A | A | A | A | A |
| 15 | A | A | A | A | A | A |
| 16 | AA | AA | A | A | A | A |

TABLE 4-continued

| | Drying time | | Blurring | | Anti- | Fre- |
|---|---|---|---|---|---|---|
| | Copy paper | Bond paper | Copy paper | Bond paper | clog- ging | quency response |
| 17 | AA | AA | A | A | A | A |
| 18 | AA | AA | A | A | A | A |
| Comparative Example: | | | | | | |
| 13 | C | B | B | B | B | B |
| 14 | B | B | B | B | B | B |
| 15 | B | B | B | B | B | B |
| 16 | AA | AA | C | C | B | B |
| 17 | AA | AA | C | C | A | A |
| 18 | AA | AA | C | C | A | A |

As is seen from the results shown in Table 4, the inks of Examples 13 to 18, compared with the inks of Comparative Examples 13 to 18, show superior drying time, occurrence of blurring, anti-clogging and frequency response because of the compound having an oxazolyl group contained therein.

As described above, ink-jet recording carried out using the ink of the present invention can bring about recorded images free from uneven print quality level due to differences in recording paper, having superior drying time and rub-off fastness and free from a decrease in print density and blurring. Since also it is unnecessary to add highly viscous organic solvents as in the prior art, stable recording can be performed without causing the problems of ink ejection stability and solidification at head tips.

Thus, the ink of the present invention enables good recording also on plain paper such as paper for copying, paper for reporting, notepaper, letter paper, bond paper and computer printout paper commonly used.

What is claimed is:

1. An ink suitable for an ink-jet system, which comprises a pigment, an aqueous medium, a water-soluble resin having an oxazolyl group or a fine particle having oxazolyl groups adsorbed on its outer surface, and a compound having at least one carbonyl group and has a viscosity of not more than 15 cP at 25° C.

2. The ink according to claim 1, wherein said compound having at least one carbonyl group is a water-soluble resin having at least one carbonyl group.

3. An ink suitable for an ink-jet system, which comprises a dye having at least one carbonyl group, an aqueous medium and a water-soluble resin having an oxazolyl group or a fine particle having oxazolyl groups adsorbed on its outer surface, and which has a viscosity of not more than 15 cP at 25° C.

4. The ink according to any one of claims 1 to 3, wherein the water-soluble resin having an oxazolyl group or a fine particle having oxazolyl groups absorbed on its outer surface is contained in an amount ranging from 0.1 to 10% by weight based on the total weight of the ink.

5. The ink according to 1, wherein said water-soluble resin is contained in an amount ranging from 0.1 to 5% by weight based on the total weight of the ink.

6. The ink according to claim 1, wherein said water-soluble resin has a weight average molecular weight ranging from 1,000 to 30,000.

7. The ink according to claim 3, wherein said dye is contained in an amount ranging from 0.2 to 20% by weight based on the total weight of the ink.

8. An ink-jet recording process comprising ejecting an ink from an orifice according to recording signals to make a record on a recording medium, wherein said ink comprises the ink according to claims 1 or 3.

9. The ink-jet recording process according to claim 8, wherein heat energy acts on the ink to eject ink droplets.

10. A recording unit comprising an ink holder that holds an ink, and a head assembly for ejecting the ink in the form of ink droplets, wherein said ink comprises the ink according to claims 1 or 3.

11. The recording unit according to claim 10, wherein said head assembly comprises a head assembly where heat energy acts on the ink to eject ink droplets.

12. An ink-jet recording apparatus comprising a recording head for ejecting ink droplets, an ink cartridge having an ink holder that holds an ink, and an ink feeding means for feeding the ink to the recording head, wherein said ink comprises the ink according to claims 1 or 3.

13. The ink-jet recording apparatus according to claim 12, wherein said recording head comprises a recording head where heat energy acts on the ink to eject ink droplets.

14. The ink according to claim 1 or 3, wherein said aqueous medium comprises water and a water-soluble organic solvent.

15. The ink according to claim 1 or 3, wherein said ink-jet system is a system in which thermal energy is applied to the ink.

16. The ink according to claim 3, wherein said dye is contained in an amount ranging from 0.5 to 1% by weight based on the total weight of the ink.

17. The ink according to claim 1, wherein said pigment is contained in an amount ranging from 1 to 20% by weight based on the total weight of the ink.

18. The ink according to claim 1, wherein said pigment is contained in an amount ranging from 2 to 12% by weight based on the total weight of the ink.

19. The ink according to claim 1 or 3, wherein said water-soluble resin having an oxazolyl group or fine particle having oxazolyl groups adsorbed on its outer surface is contained in an amount ranging from 0.5 to 5% by weight based on the total weight of the ink.

20. The ink according to claim 1 or 3, wherein said viscosity is not more than 5 cP at 25° C.

21. The ink according to claim 1 or 3, wherein said ink has a surface tension ranging from 30 to 68 dyn/cm.

* * * * *

UNITED STATES PATENT AND TRADEMARK OFFICE
CERTIFICATE OF CORRECTION

PATENT NO. : 5,599,859
DATED : February 4, 1997
INVENTOR(S) : TONOGAKI, et al.

It is certified that error appears in the above-identified patent and that said Letters Patent is hereby corrected as shown below:

Column 3

Line 25, "invention" should read --invention.--.

Column 4

Line 9, "on" should be deleted;
Line 48, "No. 230," should read --No. 2300,--.

Column 6

Line 16, "diapersant" should read --dispersant--.

Column 7

Line 40, "kind of diapersant" should read --kinds of dispersant--.

Column 9

Line 52, "2%" should read --20%--.

Column 10

Line 47, "resective" should read --respective--.

UNITED STATES PATENT AND TRADEMARK OFFICE
CERTIFICATE OF CORRECTION

PATENT NO. : 5,599,859
DATED : February 4, 1997
INVENTOR(S) : TONOGAKI, et al.

It is certified that error appears in the above-identified patent and that said Letters Patent is hereby corrected as shown below:

Column 11

Line 14, "however" should read --however,--.

Column 13

Line 47, "effect" should read --eject--.

Column 16

Line 36, "Characters" should read --¶ Characters--.

Column 18

Line 2, "a" should be delected.

Column 19

Line 15, "(MC88," should read --(MCF88,--;
    Line 46, "2.0 parts" should be deleted.

Column 22

Line 52, "absorbed" should read --adsorbed--;
    Line 55, "1," should read --claim 1,--.

UNITED STATES PATENT AND TRADEMARK OFFICE
CERTIFICATE OF CORRECTION

PATENT NO. : 5,599,859
DATED : February 4, 1997
INVENTOR(S) : TONOGAKI, et al.

It is certified that error appears in the above-identified patent and that said Letters Patent is hereby corrected as shown below:

Column 24

Line 4, "1%" should read --10%--.

Signed and Sealed this

Twenty-third Day of March, 1999

Attest:

Q. TODD DICKINSON

*Attesting Officer*     *Acting Commissioner of Patents and Trademarks*